United States Patent [19]

Jackson

[11] 4,158,405

[45] Jun. 19, 1979

[54] HIGH SPEED CAN FEED MECHANISM

[75] Inventor: John M. Jackson, Potters Bar, England

[73] Assignee: Cleamax Limited, Potters Bar, England

[21] Appl. No.: 850,093

[22] Filed: Nov. 8, 1977

[30] Foreign Application Priority Data

Nov. 9, 1976 [GB] United Kingdom ............... 46599/76

[51] Int. Cl.$^{2}$ ............................................. B65G 29/00

[52] U.S. Cl. .................................... 198/480; 198/482; 198/485; 198/689

[58] Field of Search ............... 198/480, 481, 482, 484, 198/689, 803, 485, 483; 221/236, 211; 134/134, 152

[56] References Cited

U.S. PATENT DOCUMENTS

| | | | |
|---|---|---|---|
| 1,847,485 | 3/1932 | Kantor | 198/481 X |
| 3,250,213 | 5/1966 | Brigham et al. | 198/481 X |
| 3,957,152 | 5/1976 | Heitmann | 198/480 |

*Primary Examiner*—Robert B. Reeves
*Assistant Examiner*—Douglas D. Watts
*Attorney, Agent, or Firm*—Browdy & Neimark

[57] ABSTRACT

Apparatus for feeding open-mouthed cylindrical cans into pot assemblies on a continuously rotating turret of a machine for cleaning the containers, the pot assemblies being arranged so that cans therein have their longitudinal axes parallel to the rotational axis of the turret and spaced around a pitch circle co-axial with the turret, the pitch circle passing through a loading station for loading cans into the pot assemblies. The feeding apparatus comprises a feeder wheel having can locating surfaces spaced around its periphery and vacuum ports in the locating surfaces for holding cans thereon. The locating surfaces are arranged so that cans held thereagainst have their longitudinal axes parallel to the rotational axis of the feeder wheel and spaced around a pitch circle co-axial with the feeder wheel, the pitch circle of the cans on the feeder wheel passing through a feeder station and a transfer station. The feeder wheel is arranged with its axis parallel to that of the turret and with the transfer station and the loading station along a line parallel to the rotational axis of the turret. Cans are fed onto the locating surfaces of the feeder wheel at the feeder station, and cam-operated transfer units displace the cans on the feeder wheel axially from the transfer station to the loading station upon register of each can in the transfer station. The feeder wheel is rotated continuously in synchronism with rotation of the turret and at a speed such that the speed of the cans on the feeder wheel is equal to the speed of the holding units on the turret, and one of the can holding units on the turret is in register with the loading station for reception of each can fed thereto by the transfer units.

3 Claims, 5 Drawing Figures

HIGH SPEED CAN FEED MECHANISM

Figure 1:
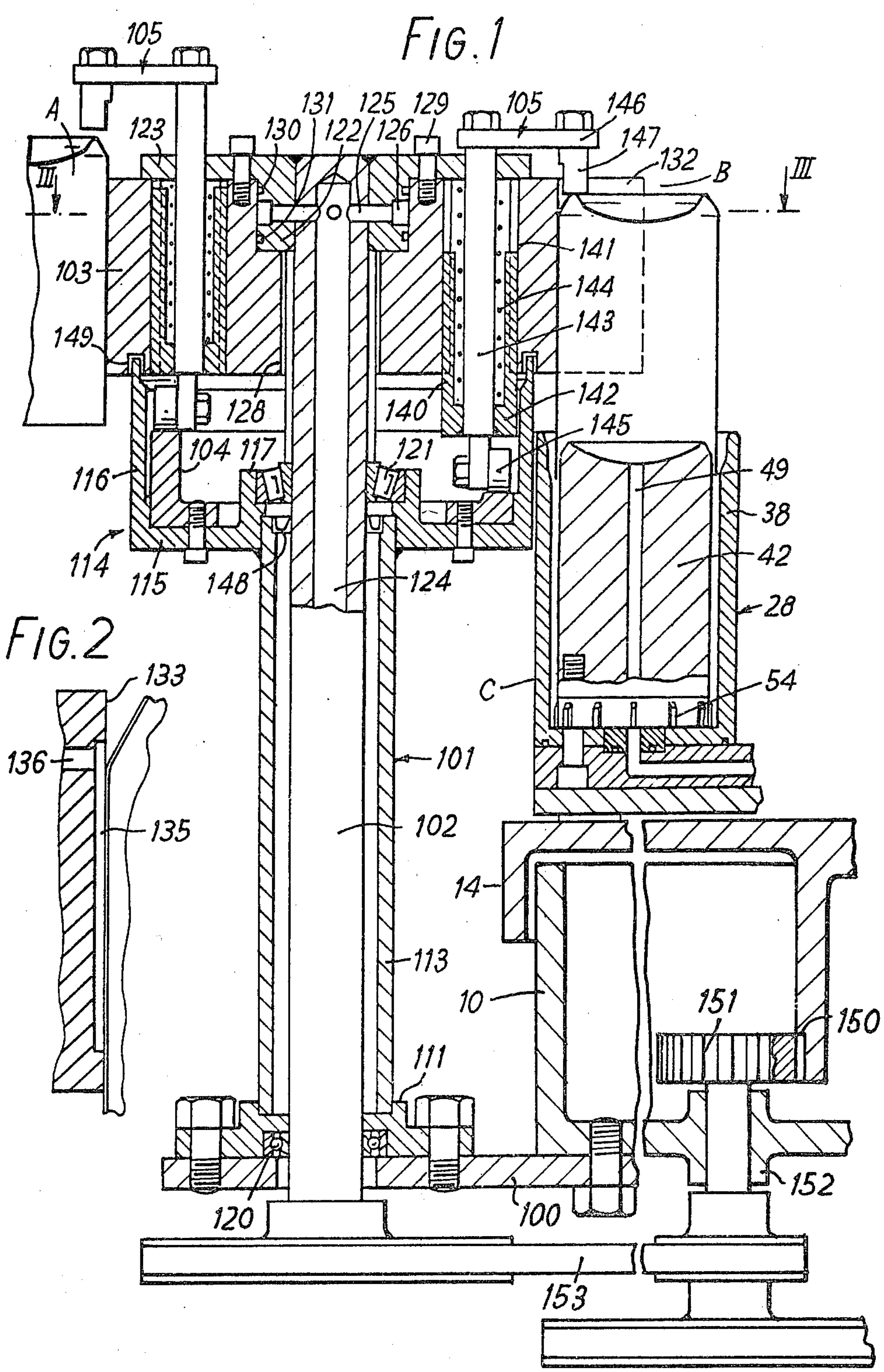

This invention relates to apparatus for feeding open-mouthed cylindrical containers of a predetermined size into a rotary machine for cleaning, printing or handling the containers in which the containers have to be fed with a high degree of accuracy on to mandrels or into cavities on a turret of the machine during rotation of the turret, and the invention is particularly applicable to container handling machines, such as the cleaning machine described and claimed in our U.S. Pat. No. 4,026,311 in which containers are drawn into position on the turret of the machine by vacuum. The containers may be made of any suitable material, but for convenience will be referred to as cans.

Hitherto, can feeding mechanisms for turret machines have generally included guide rails, but guide rails have the disadvantage that accuracy of presentation of the can to the machine can only be achieved by making the cans a close fit between the rails. If the cans are too tight in the rails they may become deformed, and if the clearance between the cans and the rails is too large there is a loss in accuracy of presentation to the machine.

The object of the invention is to provide can feeding apparatus which enables cans to be presented to a turret machine with a high degree of accuracy and speed while the turret is rotating continuously but which can nevertheless be simple in construction and operation.

According to the present invention there is provided apparatus for feeding open-mouthed cylindrical cans of a predetermined size onto a turret having a plurality of can holding units for reception of cans fed thereto in a direction substantially parallel to the rotational axes of the turret, and vacuum means for drawing the containers fully into the holding units, the can holding units being arranged on the turret so that cans therein have their longitudinal axes substantially parallel to the rotational axis of the turret and spaced around a pitch circle co-axial with the turret, the pitch circle passing through a loading station for loading cans onto the holding units, said apparatus comprising a feeder wheel rotatably mounted about an axis substantially parallel to the rotational axis of the turret, the periphery of the feeder wheel having a plurality of can locating surfaces arranged so that cans held thereagainst have their longitudinal axes substantially parallel to the rotational axis of the feeder wheel and spaced around a pitch circle co-axial with the feeder wheel, the pitch circle of the cans on the feeder wheel passing through a feeder station and a transfer station, and the cans being slidable axially along said surfaces and off the feeder wheel in a direction substantially parallel to the rotational axis of the feeder wheel at said transfer station, vacuum means for holding a can against each of said locating surfaces and for releasing the can at said transfer station, the feeder wheel being so positioned relative to the turret that said transfer station and said loading station lie along a line substantially parallel to the rotational axis of the turret to permit passage of a can from the transfer station to the loading station by axial movement of the can, means for feeding cans to said feeder station for engagement with the can locating surfaces upon passage thereof through the feeder station, transfer means operable to displace the cans on the feeder wheel axially from the transfer station to the loading station upon register of each can with the transfer station, and gear means operable to rotate the feeder wheel continuously in synchronism with rotation of the turret so that one of the can holding units on the turret is in register with the loading station for reception of each can fed thereto by said transfer means.

In the feeding apparatus of the invention the can locating surfaces preferably comprise pockets in the periphery of the feeder wheel, each pocket being shaped to engage around part of the wall of a can and being open at at least one end thereof to permit movement of a can out of the pocket and into said loading station upon register of the can in said transfer station. Such pockets tend to reshape any cans which have been deformed so as to bring them back into the original shape.

The vacuum means preferably comprise ports in the can locating surfaces, and means for extracting air through each of said ports upon movement of the port between the feeder station and the transfer station, the cans on said locating surfaces at least partially closing the ports so that the vacuum therein causes the cans to be held against the locating surfaces by differential air pressure. The ports can conveniently be arranged so that axial movement of a can in register with the transfer station opens the associated port to atmosphere and relieves the vacuum therein immediately the end of the can adjacent the turret enters a holding unit thereon.

It will of course be appreciated that, during transfer of each can from the transfer station to the loading station, the can will have a transverse component of velocity equal to the peripheral speed of the can on the feeder wheel and an axial component of velocity due to movement imparted by the transfer means.

Figure 5:
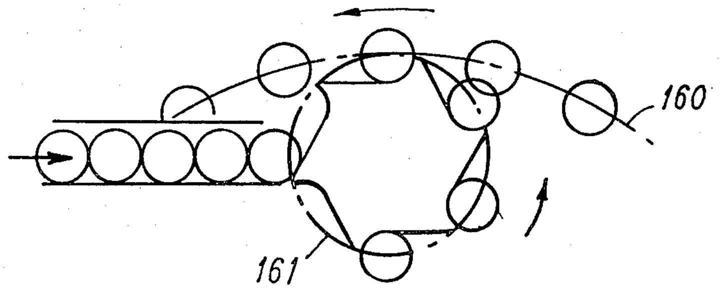

One embodiment of the invention in the form of apparatus suitable for feeding open mouthed cylindrical cans into the pot assemblies on the turret of the container cleaning machine described and illustrated in our U.S. Pat. No. 4,026,311 will now be described, by way of example, with reference to the accompanying drawings, in which:

FIG. 1 is a sectional elevation view of the feeding apparatus and part of the cleaning machine of U.S. Pat. No. 4,026,311, FIG. 2 is a detail view of part of the feeding apparatus of FIG. 1, on a larger scale, showing the vacuum port in a can locating surface on the feeder wheel, FIG. 3 is a sectional view of the feeder wheel of the apparatus taken along the line 111—111 in FIG. 1, and showing also in diagrammatic form the can feeder means and several of the pot assemblies on the turret of the cleaning machine, FIG. 4 is a development of the profile of a cam in the transfer mechanism of the apparatus of FIG. 1, but on a smaller scale, and showing also the path of movement of the follower, and FIG. 5 is a diagrammatic plan view of the feeding apparatus of FIGS. 1 and 3 in an alternative position relative to the turret of the cleaning machine.

The cleaning machine of U.S. Pat. No. 4,026,311, part of which is shown in FIG. 1, comprises a base 10, a turret 14 rotatably mounted about a vertical spindle on the base, and a plurality of pot assemblies 28 spaced at equal intervals around the periphery of the turret. Each pot assembly 28 comprises a core 42, a shell 38 surrounding the core 42, and a removable lid (not shown) which co-operates with the core and shell to form a cavity having a shape and size corresponding approximately to that of the cans to be cleaned, the width of the cavity being slightly greater than the wall thickness of the can. A can to be cleaned is fed, mouth downwards, into the cavity and is centered therein by guides 54 so that the can is spaced from the walls of the cavity and subdivides the cavity into an outer chamber between the can and the shell 38, and an inner chamber between the can and the core 42. Cleaning fluid is forced through an inlet in the lid into the outer chamber, the fluid flowing through the outer chamber, into the mouth of the can at the bottom of the cavity, through the inner chamber, and exhausting through a port 49 in the core. The upper end of the core 42 is tapered and the upper end of the shell is flared outward to facilitate entry of a can into the cavity, and during feeding of the can into the cavity, air is extracted through the port 49 so as to generate a vacuum in the inner chamber between the can and the core. This has the effect of drawing the can fully into the cavity in a very short space of time. Reference may be made to U.S. Pat. No. 4,026,311 for further details of the description and operation of the can cleaning machine.

Figure 3:
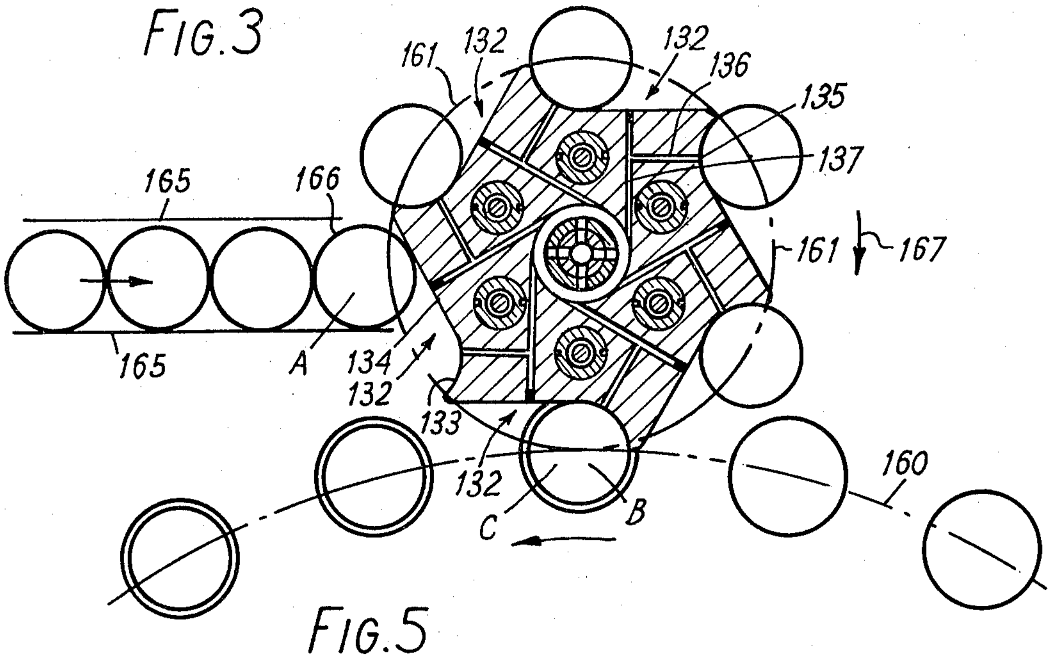
Figure 4:
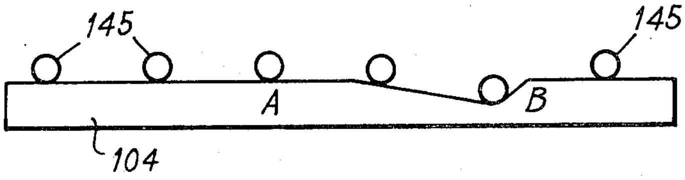

Referring to FIGS. 1–3, the feeding apparatus comprises a support plate 100, a column 101 on the plate 100, a drive shaft 102 extending through the column and rotatably mounted therein, a feeder wheel 103 secured on the upper end of the drive shaft for rotation therewith, and transfer mechanism including an annular cam 104 mounted on the top of the column 101 and a plurality of plunger units 105 mounted in the feeder wheel and controlled by the cam 104.

The support plate 100 has one end thereof secured to the base 10 of the cleaning machine. The column 101 comprises an annular base 111 secured on the support plate, an upright tube 113 having its lower end secured to the base 111, and an annular housing 114 secured on the top of the tube 113. The housing 114 has a base 115 and inner and outer walls 116, 117 respectively which together with the base 115 define an annular trough. The annular cam 104 is secured on to the base of the housing 113.

The drive shaft 102 is rotatably mounted in a lower bearing 120 in base 111 and an upper bearing 121 on the housing 114. The upper end of the shaft has a cylindrical boss 122 having a circular flange 123 at the upper end thereof. A duct 124 extends through the centre of the shaft and communicates through cross bores 125 with an annular recess 126 in the outer periphery of the boss 122, for a purpose hereinafter described.

The feeder wheel 103 has a depth equal to more than half the height of the cans to be handled, and is formed with a central stepped bore 128 which is a close fit on the boss 122, the wheel being secured to the underside of flange 123 by screws 129. Seals 130, 131 on the boss 122 ensure a fluid tight fit between the boss 122 and the wheel 103 above and below the recess 126 in the boss. The outer periphery of the feeder wheel is formed with six pockets 132 the surfaces of which are parallel to the axis of the wheel, that is the wheel has the same cross section throughout its depth. The right hand side of each pocket as viewed in FIG. 3 comprises a part-cylindrical surface 133 of a size to engage as a close fit around part of the wall of a can to be handled, and the remainder of the pocket comprises a flat surface 134 tangential to the part-cylindrical surface 133 and normal to the radius of the wheel through the junction between surfaces 133, 134. The part-cylindrical surface 133 of each pocket is formed with a longitudinal slot 135 which terminates short of the upper and lower edges of the pocket, and each slot 135 communicates through ducts 136, 137 in the wheel with the annular recess 126 in the boss 122. The duct 124 in the drive shaft is connected to a source of vacuum so as to extract air through the bores 125, recess 126, ducts 136, 137 and slots 135. Any can which engages a part-cylindrical surface 133 and covers the slot 135 will thus be held on the wheel by differential pressure.

The feeder wheel is provided with six plunger units 105, one for each pocket 132. Each plunger unit comprises a splined sleeve 140 slidable in a vertical splined bore 141 in the wheel, the lower end of the sleeve 140 having an internal flange 142, a rod 143 welded in an aperture in the flange 142 and extending upwards through the sleeve and through an aperture in flange 123, and a coil spring 144 surrounding rod 143 and compressed between the flanges 123 and 142. The lower end of rod 143 is fitted with a roller 145 which runs on cam 104, and the upper end of the rod 143 is secured to one end of a bar 146 the other end of which is secured to a pin 147 arranged to abut against any can engaged with the part-cylindrical surface 133 of the pocket when the plunger unit is forced downwards.

The trough in the housing 114 contains oil for lubricating the cam and the bearing 121. An oil seal 148 is provided between the top of the tube 113 and the drive shaft, and the upper edge of the outer wall 116 of the housing projects into a groove 149 in the underside of the feeder wheel to form a labyrinth seal to retain oil splash.

The feeder wheel is rotated in synchronism with the turret 14 by gearing including a gear 150 secured to the turret for rotation therewith, a pinion 151 secured to a stub shaft 152 and in mesh with gear 150, and a timing chain 153 mounted on sprockets on the stub shaft 152 and drive shaft 102.

The pot assemblies 28 on the cleaning machine are spaced at equal intervals around the turret 14 with their longitudinal axes on a pitch circle 160 (FIG. 3) co-axial with the turret and passing through a loading station C (FIG. 1) at the point nearest the path of movement of cans on the feeder wheel 103, and the part-cylindrical surfaces 133 on the feeder wheel are arranged so that cans held thereagainst are spaced at equal intervals around the wheel with their longitudinal axes on a pitch circle 161 co-axial with the wheel and passing through a transfer station B at the point nearest the path of movement of cans on the cleaning machine. The feeder wheel is positioned so that the pitch circles 160, 161 are tangential in plan view with a can in the transfer station B aligned with a can in the loading station C. A can may thus be transferred from the transfer station B to the loading station C by axial movement.

The gearing between the feeding apparatus and the cleaning machine is arranged so that the speed of movement of cans on the feeder wheel at pitch circle 161 is the same as the speed of movement of the pot assemblies 28 at pitch circle 160, and that each pot assembly moves into register with the loading station C at the same time that a can on the feeder wheel moves into register with the transfer station B.

In operation, cans to be loaded on to the cleaning machine are arranged in an upright position with their mouths facing downwards and are fed between guides 165 to a feeder station A in which the leading can 166 is held against the feeder wheel. The feeder wheel rotates in the direction of the arrow 167 so that the can at the feeder station rolls along the surface 134 of the adjacent pocket and onto the part-cylindrical surface 133. The can closes the slot 135, and the vacuum generated therein by extraction of air through the slot holds the can in position against the surface 133. The sleeve 140 and rod 143 of the plunger unit associated with the pocket at station A is in the fully raised position. When each can approaches the transfer station B, the cam 104 permits the sleeve 140, rod 143, and pin 147 to be forced downwards by the spring 144 so as to displace the can axially to the position shown in FIG. 2 in which the upper end of the slot 135 is uncovered, thereby releasing the vacuum. At this point, the mouth of the can projects into the cavity in a pot assembly 28 on the cleaning machine, and vacuum generated between the can and the core 142 by air extracted through port 49 causes the can to be drawn fully into the cavity in a very short space of time. FIG. 4 shows a development of the profile of the cam 104 and indicates the parts of the cam profile engaged by a plunger unit at stations A and B.

The plunger units on the feed wheel may if desired be replaced by any suitable mechanism for displacing the cans axially at the transfer station, for example pneumatic pistons actuated in synchronism with rotation of the feed wheel by suitable valve mechanism.

The feeding apparatus may if desired by positioned directly above the turret of the cleaning machine with the pitch circle 161 inside the pitch circle 160 and substantially tangential thereto, as shown in plan view in FIG. 5.

It will be appreciated that, if the feeder wheel and the turret are rotating at speed, the time available for transfer of the cans from station B to station C is very short. The permissible transfer time can however be extended by arranging the feeder wheel so that the pitch circles 160 and 161 intersect over a small arc, as viewed in plan. The cans may then be transferred during the whole length of the common chordal path between the two pitch circles. The amount of overlap must however be less than the entry tolerance, which relates to the slackness of fit between the can and the cavity in the pot assembly, to ensure safe transfer. By making maximum use of overlap of the pitch circles, speeds of operation of 400 cans per minute have been achieved with apparatus as shown in the drawings.

In the embodiment shown in the drawings, the axes of the feeder wheel and the turret of the cleaning machine are vertical, but the feeder wheel and turret may of course be arranged with their axes substantially horizontal or at any other angle provided that the axes are substantially parallel to one another.

The apparatus may if desired be provided with mechanism operable in synchronism with rotation of the feeder wheel and arranged to open the vacuum port 135 to atmosphere and thereby relieve the vacuum holding a can onto the feeder wheel immediately or slightly before the can moves into register with the transfer station.

The gearing between the feeding apparatus and the cleaning machine may be arranged so that the speed of movement of cans on the feeder wheel at pitch circle 161 is different from the speed of movement of the pot assemblies 28 at pitch circle 160, but it is of course still essential that the speeds of the feeder wheel and turret be synchronised so that one of the pot assemblies on the turret is in register with the loading station for reception of each can fed thereto by the plunger units.

We claim:

1. Apparatus for feeding open-mouthed cylindrical cans onto a turret rotating continuously on a frame, said turret having a plurality of can-holding units for reception of cans fed thereto in a direction substantially parallel to the rotational axis of the turret, the can-holding units being arranged on the turret so that cans therein have their longitudinal axes substantially parallel to the axis of the turret and spaced around a pitch circle coaxial with the turret, and vacuum means for drawing the cans fully into the holding units, and said apparatus comprising a feeder wheel formed with can-receiving pockets spaced around the periphery of said feeder wheel, means mounting said feeder wheel on said frame for rotation about an axis parallel to the rotational axis of the turret, gear means interconnecting the feeder wheel and the turret for rotation in synchronism, means for feeding cans into said pockets during rotation of the feeder wheel, holding means for holding cans in said pockets, and transfer means operable to transfer cans from said pockets into said holding units on the turret, wherein:

A. Each pocket comprises a part-cylindrical can locating surface adapted to engage as a close fit around part of the wall of a can, the axis of said part-cylindrical surface being parallel to the axis of the feeder wheel, and at least one end of the pocket being open to permit axial movement of a can engaged with said can-locating surface;

B. Said holding means comprise ports in said can locating surfaces, and means for extracting air through said ports, the cans on said locating surfaces at least partially closing the ports so that the vacuum therein causes the cans to be held against the locating surfaces by differential pressure, said holding means being adapted to release a can after insertion of an end of the can into a holding unit in the turret by said transfer means; and C. Said transfer means comprises a plurality of slide units mounted on said feeder wheel and associated one with each of said pockets, and a control cam mounted on said frame and controlling operation of the slide units, the feeder wheel being formed with guides parallel to the axis of the feeder wheel, and each slide unit comprising a slide member axially slidable in one of said guides, a follower on said slide member in engagement with said control cam, resilient means urging the slide member in a direction to hold the follower against the control cam, and an abutment on said slide member adapted to engage an end of a can on the can-locating surface of the associated pocket and impart axial sliding movement to the can under control of the cam so as to transfer the can into a holding unit on the turret at the instant of alignment therewith.

2. Apparatus as claimed in claim 1, wherein the control cam is mounted in a housing which co-operates with the feeder wheel to form a substantially closed chamber, and the slide members on the feeder wheel extend into said chamber, the followers on the slide members being in engagement with the cam, and said closed chamber forming a reservoir for oil lubricating the cam and followers.

3. Apparatus as claimed in claim 1, wherein the ports are arranged so that axial movement of a can in register with the transfer station opens the associated port to atmosphere and relieves the vacuum therein immediately the end of the can adjacent the turret enters a holding unit thereon.

* * * * *